United States Patent
Iida

(10) Patent No.: US 8,817,688 B2
(45) Date of Patent: Aug. 26, 2014

(54) RADIO RELAY DEVICE AND RADIO RELAY METHOD

(75) Inventor: Muneo Iida, Yokohama (JP)

(73) Assignee: Kyocera Corporation, Kyoto-shi, Kyoto (JP)

( * ) Notice: Subject to any disclaimer, the term of this patent is extended or adjusted under 35 U.S.C. 154(b) by 263 days.

(21) Appl. No.: 13/119,335

(22) PCT Filed: Sep. 15, 2009

(86) PCT No.: PCT/JP2009/066062
§ 371 (c)(1),
(2), (4) Date: Mar. 16, 2011

(87) PCT Pub. No.: WO2010/032716
PCT Pub. Date: Mar. 25, 2010

(65) Prior Publication Data
US 2011/0170461 A1    Jul. 14, 2011

(30) Foreign Application Priority Data

Sep. 16, 2008   (JP) .................................. 2008-235926

(51) Int. Cl.
*H04J 3/00* (2006.01)
(52) U.S. Cl.
USPC ......................................... 370/315; 370/329
(58) Field of Classification Search
USPC ......................................... 370/280, 315–327
See application file for complete search history.

(56) References Cited

U.S. PATENT DOCUMENTS

2007/0087691 A1* 4/2007 Lee et al. ................. 455/13.2
2008/0045141 A1* 2/2008 Suga ............................ 455/7
2008/0045147 A1* 2/2008 Okuda ......................... 455/15
2008/0214182 A1* 9/2008 Wang et al. ............... 455/423
2010/0183061 A1* 7/2010 Imahashi et al. .......... 375/222

FOREIGN PATENT DOCUMENTS

| JP | 2003-184935 A | 7/2003 |
| JP | 2008-067386 A | 3/2008 |
| JP | 2008-104195 A | 5/2008 |
| WO | 2007/100232 A1 | 9/2007 |
| WO | 2008/081511 A1 | 7/2008 |
| WO | 2008/152813 A1 | 12/2008 |
| WO | 2009/050794 A1 | 4/2009 |

OTHER PUBLICATIONS

Alcatel (Recommendations on IEEE 802.16j).*

(Continued)

*Primary Examiner* — Anh-Vu Ly
*Assistant Examiner* — Hashim Bhatti
(74) *Attorney, Agent, or Firm* — Procopio, Cory, Hargreaves & Savitch LLP

(57) ABSTRACT

A radio relay device (100) is applied to a radio communication system wherein a period in which downlink data are transmitted and a period in which uplink data are transmitted are provided in time division in communication time frames that are segmented on a time axis. The radio relay device (100) is provided with a donor transceiver (120D) that exchanges data with a radio base station, a remote transceiver (120R) that exchanges data with a radio terminal, and controllers (130D, 130R) that alternately execute control to operate the donor transceiver (120D) and stop the remote transceiver (120R) in at least one communication time frame, and control to stop the donor transceiver (120D) and operate the remote transceiver (120R) in at least one communication time frame.

6 Claims, 6 Drawing Sheets

(56) References Cited

OTHER PUBLICATIONS

David Comstock et al. (A Flexible Multi-hop Frames Structure for IEEE802.16j).*

Notification of Reasons for Refusal dated Oct. 11, 2011, issued for counterpart Japanese Application No. 2008-235926.

Shen et al., "Recommendations on IEEE 802.16j", IEEE C802.16j-06/004r1, May 8, 2006, Alcatel, Research & Innovation, Shanghai, P.R.C.

Comstock et al., "A Flexible Multi-hop Frame Structure for IEEE 80216j", IEEE 802.16j-06_163, Nov. 7, 2006, Huawei Technologies, Shanghai, P.R.C.

Leng et al., "Multihop Relay Frame Structure", IEEE C802.16j-06/277, Nov. 7, 2006, Alcatel Shanghai Bell, Shanghai, P.R.C.

International Search Report and Written Opinion dated Dec. 8, 2009 issued by the Japanese Patent Office for International Application No. PCT/JP2009/066062.

* cited by examiner

FIG. 2
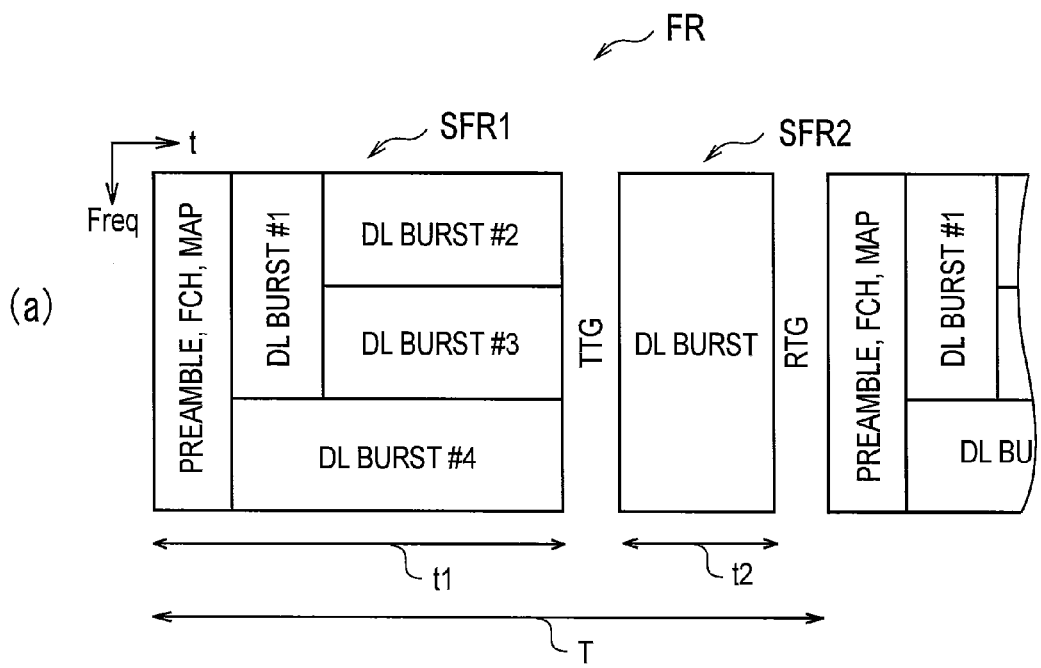
(a)
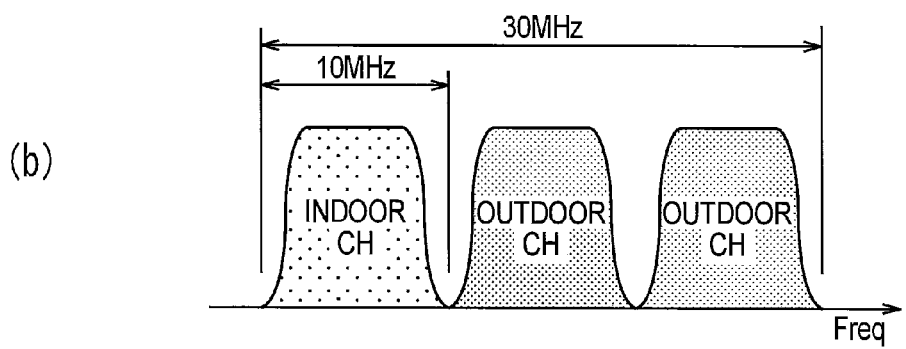
(b)

RADIO RELAY DEVICE AND RADIO RELAY METHOD

TECHNICAL FIELD

The present invention relates to a radio relay device and a radio relay method for relaying data transmitted and received by a first radio communication device and a second radio communication device in a radio communication system employing a time division duplex scheme.

BACKGROUND ART

Heretofore, a radio relay device for relaying data transmitted and received by a first radio communication device such as a radio base station and a second radio communication device such as a radio terminal has been widely used (see Patent Document 1, for example). Such a radio relay device includes a first transceiver for performing first transmission and reception of transmitting and receiving data to and from the first radio communication device, and a second transceiver for performing second transmission and reception of transmitting and receiving data to and from the second radio communication device.

The time division duplex (TDD) scheme is known as a scheme for achieving bidirectional transmission in a radio communication system. In the TDD scheme, each of communication time frames (communication frames) segmented on a time axis is provided, by time sharing, with a first time period for transmitting data from the first radio communication device to the second radio communication device (a downstream frame, for example), and a second time period for transmitting data from the second radio communication device to the first radio communication device (an uplink frame, for example).

In a case of using the radio relay device in a radio communication system employing the TDD scheme, reception of data by the first transceiver from the first radio communication device and transmission of data by the second transceiver to the second radio communication device are performed simultaneously during the first time period. Similarly, reception of data by the second transceiver from the second radio communication device and transmission of data by the first transceiver to the first radio communication device are performed simultaneously during the second time period.

Accordingly, a radio wave emitted from an antenna of the second transceiver in the first time period propagates to an antenna of the first transceiver, and a radio wave emitted from the antenna of the first transceiver in the second time period propagates to the antenna of the second transceiver. Such propagation is problematic in that the first transceiver and the second transceiver affect each other by mutual interference.

CITATION LIST

Patent Document

Patent Document 1: Japanese Patent Application Publication No. 2008-67386 (see [ABSTRACT] and the like)

SUMMARY OF THE INVENTION

To avoid the aforementioned influence by interference, any of the following methods (a) to (c) is conceivable. (a) Arrange the each antenna of the first transceiver and that of the second transceiver with a large spacing in between, or place a radio wave shield between the antennas. (b) Introduce an advanced signal processing technique for eliminating the influence by interference. (c) Use communication frequencies which are separated with a large interval in between for the first transceiver and for the second transceiver.

However, the methods (a) and (b) have a problem that size and cost of the radio relay device are increased. The method (c) has a problem that, since communication frequencies usable by the radio relay device are previously set, it is difficult to change the communication frequencies.

Hence, the present invention has an objective to provide a radio relay device and a radio relay method which allow data to be relayed continuously while avoiding influence by interference in the radio relay device without changing the communication frequencies, and are also prevented from increasing in size and cost.

In order to solve the problems described above, the present invention has the following features. First of all, according to a first feature of the present invention, there is provided a radio relay device (radio relay device 100) configured to relay data transmitted and received by a first radio communication device (e.g. radio base station 200) and a second radio communication device (e.g. radio terminal 300) in a radio communication system (radio communication system 1) in which each of communication time frames (communication frame time period Tn) segmented on a time axis is provided, by time sharing, with a first time period (e.g. downlink subframe time period t1) for transmitting data from the first radio communication device to the second radio communication device, and a second time period (e.g. uplink subframe time period t2) for transmitting data from the second radio communication device to the first radio communication device, the radio relay device comprising: a first transceiver (donor transceiver 120D) configured to perform first transmission and reception of receiving data from the first radio communication device in the first time period and transmitting data to the first radio communication device in the second time period; a second transceiver (remote transceiver 120R) configured to perform second transmission and reception of transmitting data to the second radio communication device in the first time period and receiving data from the second radio communication device in the second time period; and a controller (controller 130D, controller 130R) configured to control the first transmission and reception as well as the second transmission and reception, wherein the controller performs first control of causing execution of the first transmission and reception and suspending the second transmission and reception during at least one communication time frame, and second control of suspending the first transmission and reception and causing execution of the second transmission and reception during at least one communication time frame.

According to this radio relay device, the controller performs first control of causing execution of first transmission and reception and suspending second transmission and reception during at least one communication time frame, to thereby prevent a radio wave emitted from the first transceiver from interfering with the second transceiver. In addition, the controller performs second control of suspending first transmission and reception and causing execution of second transmission and reception during at least one communication time frame, to thereby prevent a radio wave emitted from the second transceiver from interfering with the first transceiver. Data can be relayed continuously since first transmission and reception can be performed under first control and second transmission and reception can be performed under second control. Further, since only control by the controller of whether to perform or suspend each of first transmission and reception and second transmission and reception is required in units of communication time frames, no communication frequencies need to be changed and an increase in the size and cost of the radio relay device can be suppressed as compared to the above methods (a) or (b).

A second feature of the present invention is according to the first feature of the present invention and is summarized in that the controller alternately performs the first control and the second control.

A third feature of the present invention is according to the first feature or the second feature of the present invention and is summarized in that the second transceiver transmits, to the second radio communication device, synchronization information (e.g. preamble) used to establish and maintain synchronization between the radio relay device and the second radio communication device, and the controller shifts a timing, at which the second transceiver transmits the synchronization information to the second radio communication device, to a point on a time axis before an initiation timing (initiation timing t0) of the communication time frame.

A fourth feature of the present invention is according to the first feature of the present invention and is summarized in that radio communication according to orthogonal frequency division multiplexing is performed in the radio communication system.

A fifth feature of the present invention is according to the first feature of the present invention and is summarized in that the first radio communication device is a radio base station (radio base station 200) and the second radio communication device is a radio terminal (radio terminal 300).

According to a sixth feature of the present invention, there is provided a radio relay method which is used for a radio relay device to relay data transmitted and received by a first radio communication device and a second radio communication device in a radio communication system in which each of communication time frames segmented on a time axis is provided, by time sharing, with a first time period for transmitting data from the first radio communication device to the second radio communication device, and a second time period for transmitting data from the second radio communication device to the first radio communication device, the radio relay method comprising the step of: controlling first transmission and reception of receiving data from the first radio communication device in the first time period and transmitting data to the first radio communication device in the second time period, and second transmission and reception of transmitting data to the second radio communication device in the first time period and receiving data from the second radio communication device in the second time period, wherein in the controlling step, first control is performed to cause execution of the first transmission and reception and to suspend the second transmission and reception during at least one communication time frame, and second control is performed to suspend the first transmission and reception and to cause execution of the second transmission and reception during at least one communication time frame.

The present invention can provide a radio relay device and a radio relay method which allow data to be relayed continuously while avoiding influence by interference in the radio relay device without changing the communication frequencies, and are also prevented from increasing in size and cost.

BRIEF DESCRIPTION OF DRAWINGS

FIG. 2(a) is a diagram showing a configuration example of a communication frame used in the radio communication system according to the embodiment of the present invention. FIG. 2(b) is a diagram showing an example of frequency bands used in the radio communication system according to the embodiment of the present invention.

DESCRIPTION OF EMBODIMENTS

Figure 1:
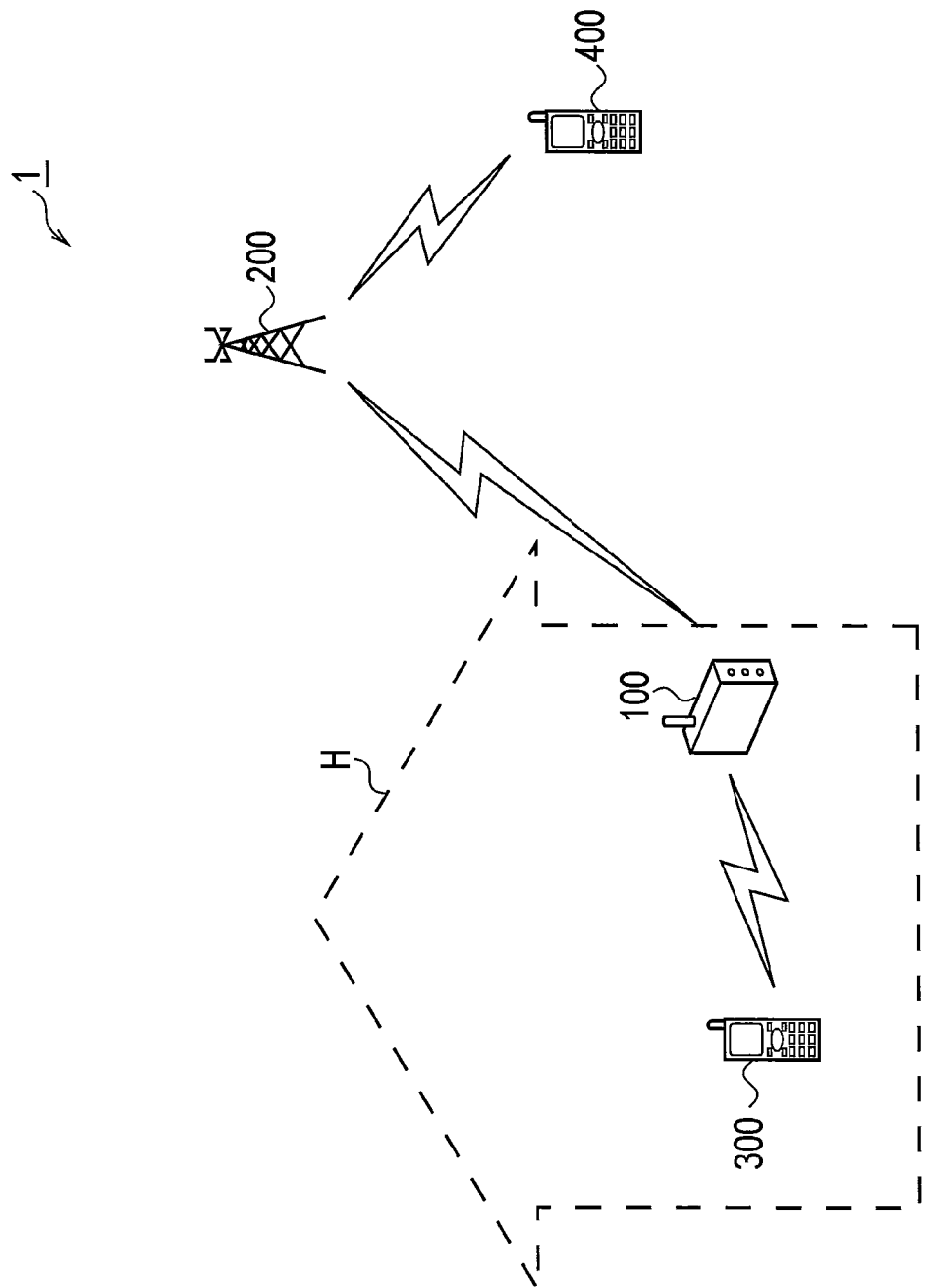
FIG. 1 is a schematic configuration diagram of a radio communication system according to an embodiment of the present invention.

Next, a radio communication system according to an embodiment of the present invention will be described with reference to the drawings. Specifically, (1) Schematic Configuration of Radio Communication System, (2) Configuration of Radio Relay Device, (3) Schematic Operation of Radio Relay Device, (4) Operation of Radio Communication System, (5) Advantageous Effects, and (6) Other Embodiments will be described. In the following description of the drawings in conjunction with the embodiment, identical or similar constituents are designated by identical or similar reference numerals.

(1) Schematic Configuration of Radio Communication System

FIG. 1 is a schematic configuration diagram of a radio communication system 1 according to the embodiment.

As shown in FIG. 1, the radio communication system 1 includes a radio relay device 100, a radio base station 200, a radio terminal 300 and a radio terminal 400. The radio communication system 1 is configured in accordance with WiMAX (IEEE 802.16). In other words, the radio communication system 1 employs the orthogonal frequency division multiplexing (OFDM)/orthogonal frequency division multiplexing access (OFDMA) scheme and time division duplex (TDD) scheme.

The OFDM/OFDMA scheme achieves multiple access by use of a large number of mutually orthogonal sub carriers. The TDD scheme achieves bidirectional transmission by performing uplink communication and downlink communication by time sharing in a single communication frame (communication time frame). Note that "uplink" is the direction from the radio terminal 300 to the radio base station 200, and "downlink" is the direction from the radio base station 200 to the radio terminal 300.

The radio relay device 100 relays data transmitted and received by the radio base station 200 and the radio terminal 300. This configuration allows the radio terminal 300 to more surely exchange data with the radio base station 200 via the radio delay device 100, even if the radio terminal 300 is located out of range of a cell (communication area) of the radio base station 200 or is located at a border of the cell (cell fringe). In the example of FIG. 1, the radio relay device 100 is installed in a home H and performs radio communication with the radio terminal 300 located inside the home H. Such a radio relay device 100 needs to be small and inexpensive.

Note that the radio terminal 400 directly exchanges data with the radio base station 200 without having the data relayed by the radio relay device 100.

FIG. 2(*a*) is a diagram showing a configuration example of a communication frame FR used in the radio communication system 1. In WiMAX, downlink communication is firstly performed and then uplink communication is performed within a communication frame time period T of about 5 ms. Specifically, as shown in FIG. 2(*a*), the communication frame FR includes a downlink subframe SFR1 and an uplink subframe SFR2 arranged after the downlink subframe SFR1.

Hereafter, a time period when downlink communication is performed within a communication frame time period T is referred to as a downlink subframe time period t1 (first time period), and a time period when uplink communication is performed within the communication frame time period T is referred to as an uplink subframe time period t2 (second time period). Downlink communication generally requires a larger communication capacity than uplink communication, and thus the time length of the downlink subframe time period t1 is longer than the time length of the uplink subframe time period t2.

The top part of the downlink subframe SFR1 is a region where various control data is allocated, and what follows is a burst region where a data burst is allocated. The control data includes a preamble which is a known symbol used to establish and maintain synchronization, a MAP which indicates an allocation status of a data burst, and the like. Here, an allocation status indicates time and frequency used for transmission of a data burst. A MAP is configured of a DL-MAP indicating an allocation status of a downlink data burst and a UL-MAP indicating an allocation status of an uplink data burst.

A guard time (TTG: transmit transition gap) is provided between the downlink subframe SFR1 and the uplink subframe SFR2. Similarly, a guard time (RTG: receive transition gap) is provided between the uplink subframe SFR2 and the next communication frame. For example, in the radio base station 200, TTG is a guard time for switching from transmission to reception, and RTG is a guard time for switching from reception to transmission.

FIG. 2(*b*) is a diagram showing an example of frequency bands used in the radio communication system 1. As shown in FIG. 2(*b*), frequency bands usable by the radio relay device 100 in the radio communication system 1 are previously set. In the example in FIG. 2(*b*), a frequency band of 30 MHz is usable, and the frequency band is equally divided into three communication frequencies each having a frequency of 10 MHz. The two communication frequencies on the high-frequency side are used for radio communication between the radio base station 200 and the radio relay device 100, and the single communication frequency on the low-frequency side is used for radio communication between the radio terminal 300 and the radio relay device 100. Thus, close frequencies are used for radio communication between the radio base station 200 and the radio relay device 100 and radio communication between the radio terminal 300 and the radio relay device 100.

(2) Configuration of Radio Relay Device

Figure 3:
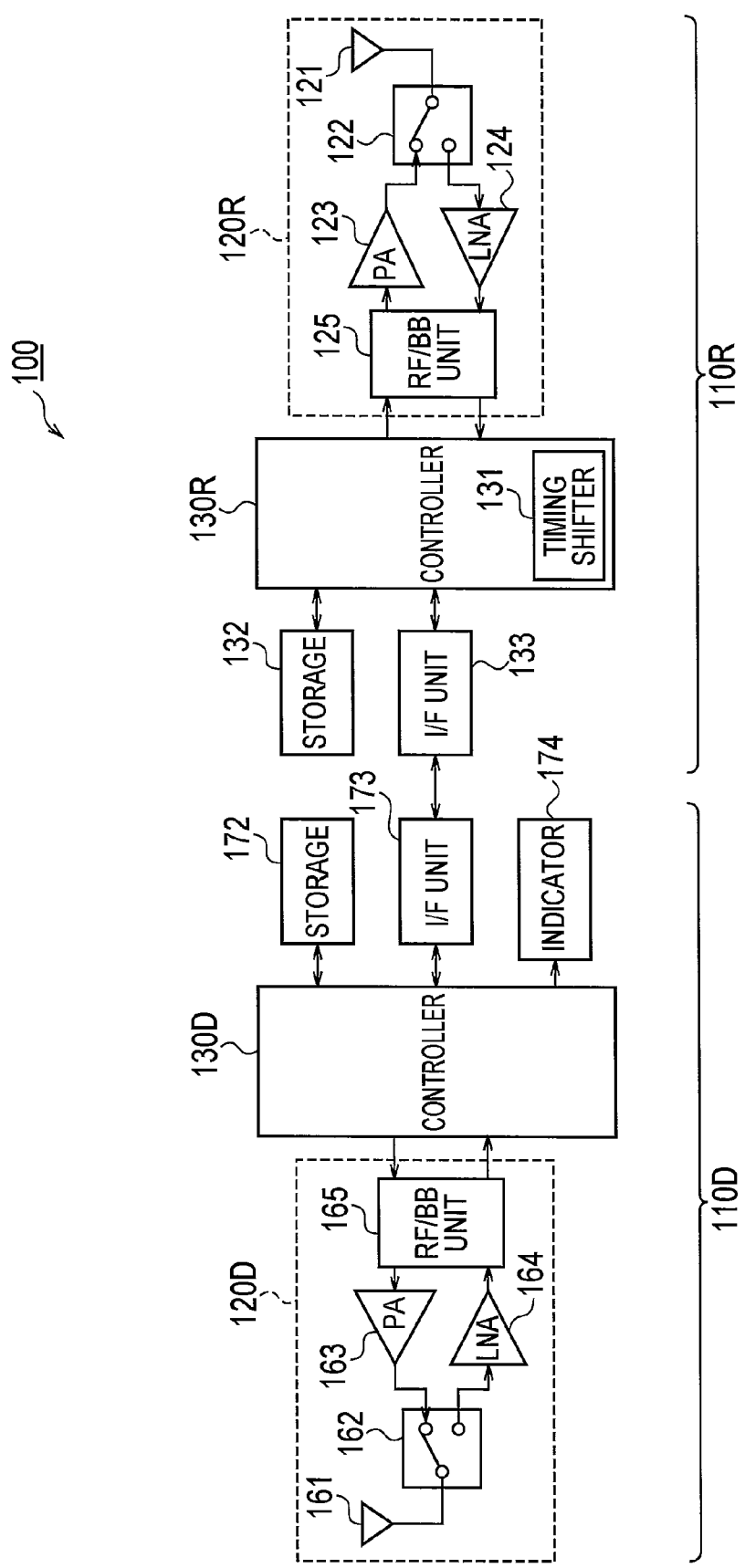
FIG. 3 is a block diagram showing a functional block configuration of a radio relay device according to the embodiment of the present invention.

Next, a description will be given of a configuration of the radio relay device 100. FIG. 3 is a block diagram showing a functional block configuration of the radio relay device 100.

As shown in FIG. 3, the radio relay device 100 includes a donor communication unit 110D used for communication with the radio base station 200 and a remote communication unit 110R used for communication with the radio terminal 300. The donor communication unit 110D is provided with the same communication function as a radio terminal, and the remote communication unit 110R is provided with the same communication function as a radio base station. The donor communication unit 110D and the remote communication unit 110R are connected via wireline connections using Ethernet (registered trademark) or the like.

The donor communication unit 110D includes a donor transceiver 120D (first transceiver), a controller 130D, a storage 172, an interface (I/F) unit 173 and an indicator 174. The donor transceiver 120D performs donor transmission and reception (first transmission and reception) of exchanging data with the radio base station 200 according to the OFDM/OFDMA scheme and the TDD scheme. To be specific, the donor transceiver 120D includes a donor antenna 161, a transmission/reception switch 162, a power amplifier (PA) 163, a low noise amplifier (LNA) 164, and a radio frequency/base band (RF/BB) unit 165.

The controller 130D is configured of a CPU, for example, and controls various functions of the donor communication unit 110D. The storage 172 is configured of a memory, for example, and stores therein various information used by the donor communication unit 110D to perform control and the like. The I/F unit 173 is connected to the remote communication unit 110R. The indicator 174 is controlled by the controller 130D to display information on the reception level from the radio base station 200.

The remote communication unit 110R includes a remote transceiver 120R (second transceiver), a controller 130R, a storage 132, and an I/F unit 133. The remote transceiver 120R performs remote transmission and reception (second transmission and reception) of exchanging data with the radio terminal 300 according to the OFDM/OFDMA scheme and the TDD scheme. To be specific, the remote transceiver 120R includes a remote antenna 121, a transmission/reception switch 122, a PA 123, an LNA 124, and an RF/BB unit 125.

The controller 130R is configured of a CPU, for example, and controls various functions of the remote communication unit 110R. The storage 132 is configured of a memory, for example, and stores therein various information used by the remote communication unit 110R to perform control and the like. The I/F unit 133 is connected to the donor communication unit 110D.

In this embodiment, the controllers 130D and 130R constitute a controller that controls donor transmission and reception as well as remote transmission and reception. The controllers 130D and 130R alternately perform first control and second control. First control causes execution of donor transmission and reception and suspends remote transmission and reception during at least one communication frame time period, whereas second control causes execution of remote transmission and reception and suspends donor transmission and reception during at least one communication frame time period.

The controller 130R includes a timing shifter 131. The timing shifter 131 shifts the timing, at which the remote transceiver 120R transmits a preamble to the radio terminal 300, to a point on the time axis before an initiation timing t0 of a communication frame time period (see FIG. 5). The preamble is used to establish and maintain synchronization between the radio relay device 100 and the radio terminal 300.

(3) Schematic Operation of Radio Relay Device

Figure 4:
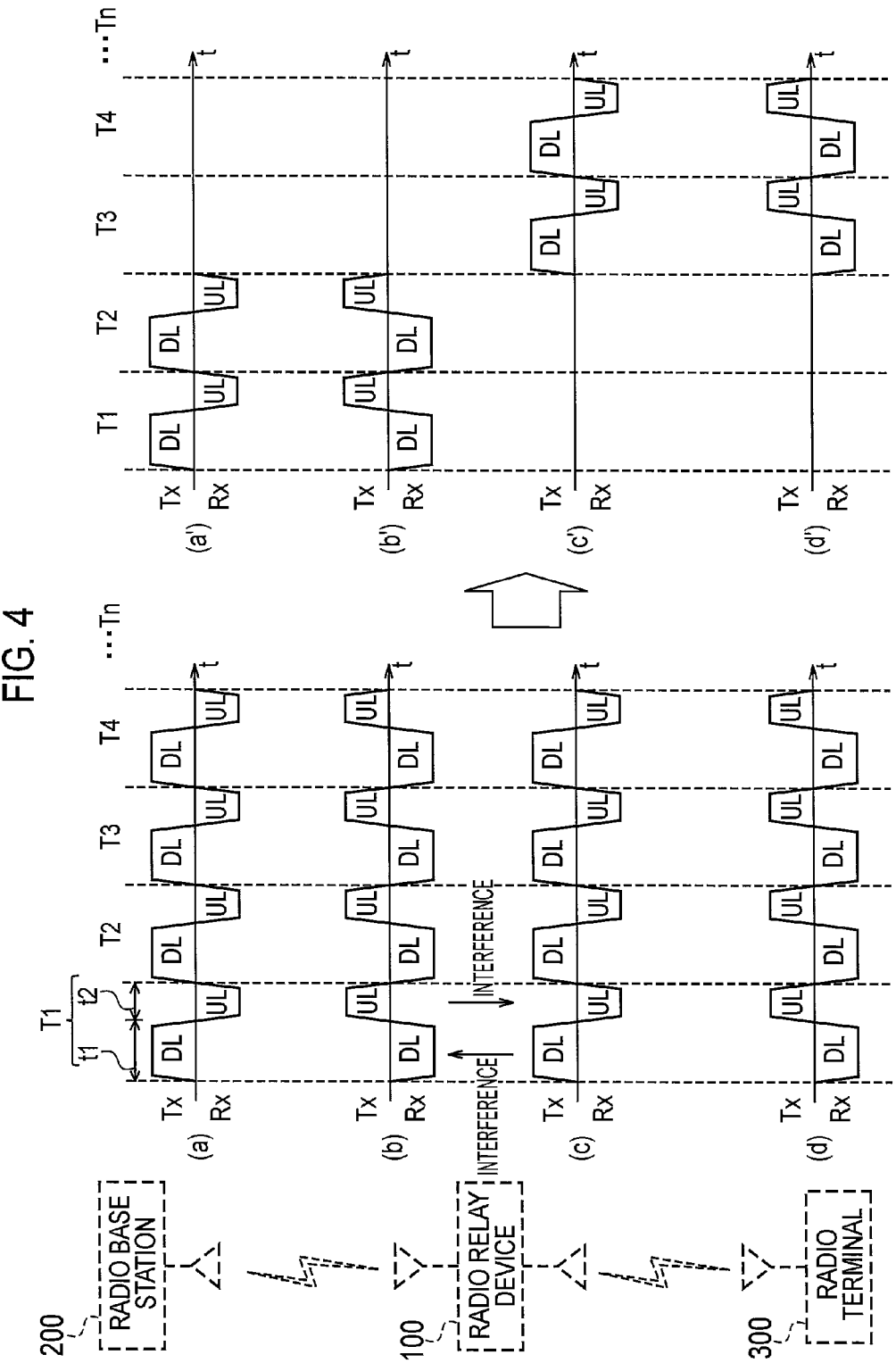
FIG. 4 is a timing chart for describing an outline of an operation of the radio relay device according to the embodiment of the present invention.

Next, a description will be given of a schematic operation of the radio relay device 100. FIG. 4 is a time chart for describing the schematic operation of the radio relay device 100.

FIG. 4(a) to FIG. 4(d) show how the radio base station 200, the radio relay device 100 and the radio terminal 300 communicate according to a conventional method. FIG. 4(a') to FIG. 4(d') show how the radio base station 200, the radio relay device 100 and the radio terminal 300 communicate according to the method of this embodiment.

FIG. 4(a) and FIG. 4(a') show operations of the radio base station 200, FIG. 4(b) and FIG. 4(b') show operations of the donor transceiver 120D of the radio relay device 100, FIG. 4(c) and FIG. 4(c') show operations of the remote transceiver 120R of the radio relay device 100 and FIG. 4(d) and FIG. 4(d') show operations of the radio terminal 300.

As shown in FIG. 4(a) to FIG. 4(d), a downlink subframe time period t1 and an uplink subframe time period t2 are provided by time sharing in each communication frame time period Tn. As shown in FIG. 4(b), the donor transceiver 120D of the radio relay device 100 receives data from the radio base station 200 during the downlink subframe time period t1, and transmits data to the radio base station 200 during the uplink subframe time period t2.

In the conventional method as shown in FIG. 4(c), the remote transceiver 120R of the radio relay device 100 transmits data to the radio terminal 300 during the downlink subframe time period t1, and receives data from the radio terminal 300 during the uplink subframe time period t2. Accordingly, the remote transceiver 120R interferes with the donor transceiver 120D during the downlink subframe time period t1, and the donor transceiver 120D interferes with the remote transceiver 120R during the uplink subframe time period t2.

Meanwhile, in this embodiment as shown in FIG. 4 (b') and FIG. 4(c'), the controllers 130D and 130R perform first control of causing execution of donor transmission and reception and suspending remote transmission and reception for two communication frame time periods, as well as second control of suspending donor transmission and reception and causing execution of remote transmission and reception for two communication frame time periods.

In the example of FIG. 4(b') and FIG. 4(c'), the controllers 130D and 130R perform first control during communication frame time periods T1 and T2, and perform second control during communication frame time periods T3 and T4. For example, the radio relay device 100 transmits data, which is received from the radio base station 200 during the downlink subframe time period t1 of the communication frame time period T1, to the radio terminal 300 during the downlink subframe time period t1 of the communication frame time period T3. Thus, the data is stored in the storage 132 or the storage 172 for the time periods T1 to T3.

Note that although control is switched between first control and second control for every two communication frames, the invention is not limited to this and control may be switched between first control and second control for each communication frame or control may be switched between first control and second control for every three or more communication frames.

(4) Operation of Radio Communication System

Next, a description will be given of an operation of the radio communication system 1 with reference to FIG. 5 and FIG. 6.

Figure 5:
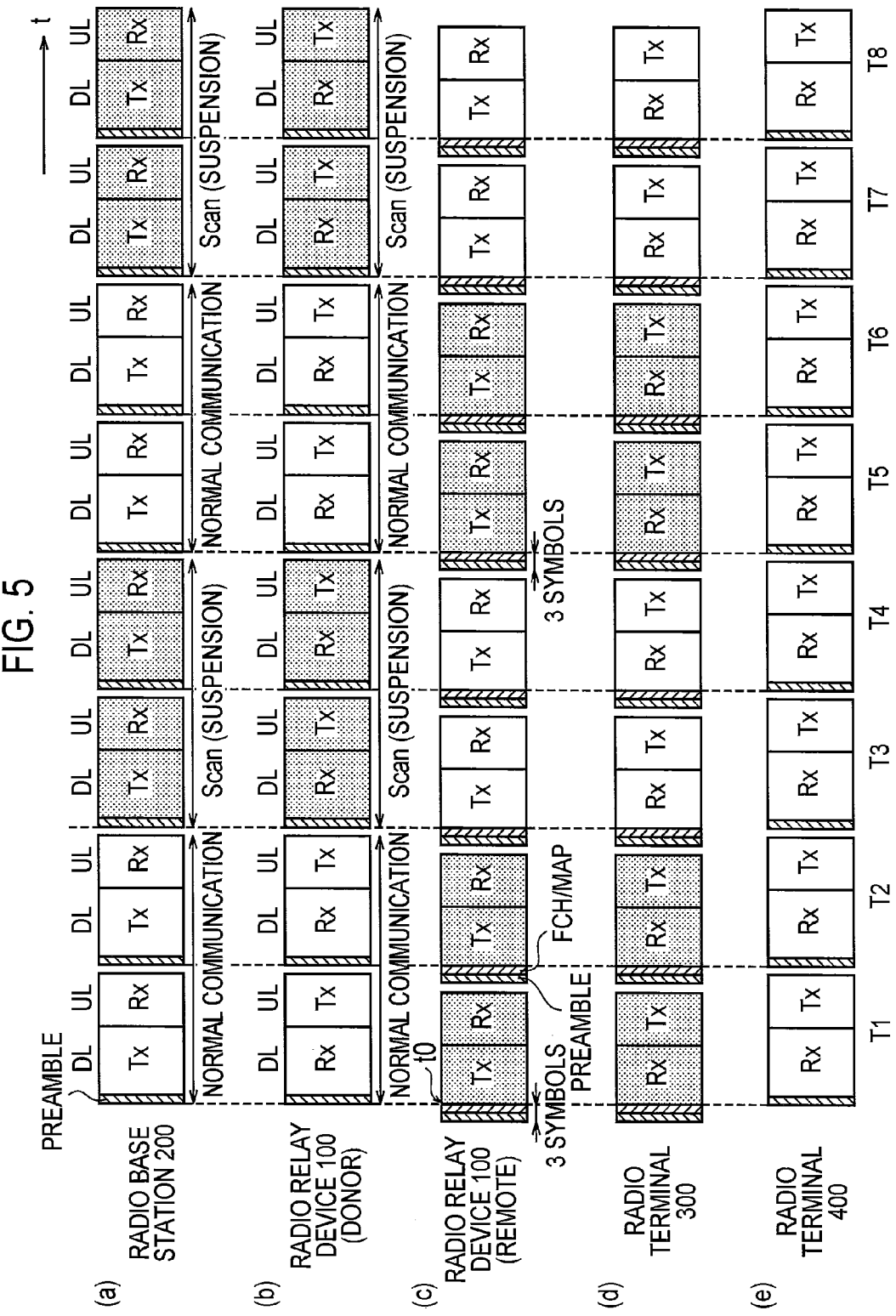
FIG. 5 is a timing chart for describing an operation of the radio communication system according to the embodiment of the present invention.

FIG. 5 is a timing chart for describing an operation of the radio communication system 1. As shown in FIG. 5, the timing shifter 131 of the radio relay device 100 shifts the timing, at which the remote transceiver 120R transmits a preamble to the radio terminal 300, to a point before an initiation timing t0 of a communication frame time period. The preamble corresponds to the top symbol of a communication frame, and is used to establish and maintain synchronization between the radio relay device 100 and the radio terminal 300.

Further, the timing shifter 131 also shifts a frame control header (FCH) and a MAP which follow the preamble to the point before the initiation timing t0. The FCH and the MAP correspond to two symbols following the preamble. As a result, a total of three symbols including the preamble, the FCH and the MAP are shifted. By performing such shift processing, the preamble, the FCH and the MAP can be transmitted to the radio terminal 300 before suspending remote transmission and reception even in a case of suspending remote transmission and reception under first control during a certain communication frame time period.

In FIG. 5, first control is performed during communication time periods T1 and T2, second control is performed during communication time periods T3 and T4, first control is performed during communication time periods T5 and T6, and second control is also performed during communication time periods T7 and T8. Consequently, switching is performed between normal operation and suspension of donor transmission and reception for every two communication frames, so that transmission and reception is performed intermittently (referred to below as intermittent transmission and reception). Similarly, switching is performed between normal operation and suspension of remote transmission and reception for every two communication frames, so that intermittent transmission and reception is performed.

When suspending remote transmission and reception, the controller 130R of the radio relay device 100 transmits a MAP indicating that there is no data to be exchanged with the radio terminal 300 to the radio terminal 300 by use of the remote transceiver 120R. Thus, data transmission and reception by the radio terminal 300 during the communication frame time periods T1, T2, T5 and T6 can be suspended. As described above, the timing shifter 131 shifts the MAP to the point before the initiation timing t0, and thus it is possible to transmit the MAP to the radio terminal 300 before suspending remote transmission and reception.

In the case of suspending donor transmission and reception, the controller 130D of the radio relay device 100 uses a scanning mechanism to suspend donor transmission and reception. Scanning is normally an operation of a radio terminal for searching for a handover destination radio base station by intermittently suspending radio communication with a radio base station and receiving signals from other radio base stations in the meantime. However, note that in this embodiment the donor communication unit 110D does not actually need to receive signals from other radio base stations, as long as data transmission and reception by the radio base station 200 is suspended. Thus, donor transmission and reception during the communication frame time periods T3, T4, T7 and T8 can be suspended.

Figure 6:
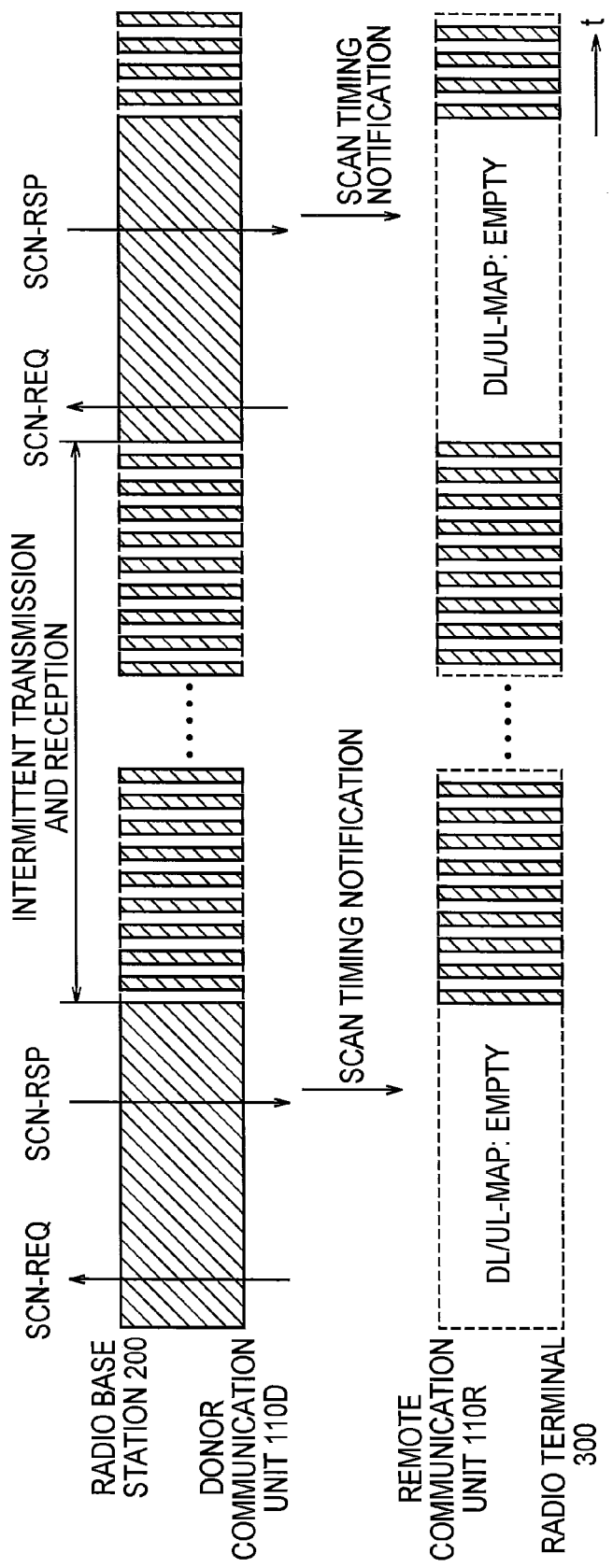
FIG. 6 is a diagram for describing scanning used in the radio relay device according to the embodiment of the present invention.

FIG. 6 is a diagram for describing a scanning procedure. Before initiating the intermittent transmission and reception as in FIG. 5, the radio relay device 100 exchanges messages with the radio base station 200 to initiate the scanning. To be specific, the donor communication unit 110D of the radio relay device 100 transmits SCN-REQ for requesting scanning to the radio base station 200. Here, SCN-REQ includes information indicating the timing to initiate scanning, information indicating the period of performing the scanning and information indicating the time interval for performing the scanning within the time period.

Upon acceptance of SCN-REQ, the radio base station 200 transmits SCN-RSP (accept) which is a response indicating the acceptance to the radio relay device 100. During this negotiation, the remote communication unit 110R of the radio relay device 100 suspends remote transmission and reception by use of a MAP. Upon receipt of SCN-RSP (accept) from the radio base station 200, the donor communication unit 110D notifies the remote communication unit 110R of the scan initiation timing, the scanning period and the like, and the intermittent transmission and reception as in FIG. 5 is initiated. Note that after the elapse of the scanning period, another negotiation is carried out to initiate the next scanning, and then the next scanning is initiated.

(5) Advantageous Effects

As has been described, the controller 130D and 130R perform first control of causing execution of donor transmission and reception and suspending remote transmission and reception during at least one communication frame time period. Accordingly, it is possible to prevent a radio wave emitted from the donor transceiver 120D from interfering with the remote transceiver 120R during the communication frame time period.

Similarly, the controller 130D and 130R perform second control of suspending donor transmission and reception and causing execution of remote transmission and reception during at least one communication frame time period. Accordingly, it is possible to prevent a radio wave emitted from the remote transceiver 120R from interfering with the donor transceiver 120D during the communication frame time period.

In addition, the controllers 130D and 130R can more surely continue to relay data by alternately performing first control and second control to thereby avoid interference.

Further, since only control by the controllers 130D and 130R of whether to perform or suspend each of donor transmission and reception and remote transmission and reception is required, no communication frequencies need to be changed and an increase in the size and cost of the radio relay device can be suppressed.

In this embodiment, the timing shifter 131 of the controller 130R shifts the timing, at which the remote transceiver 120R transmits a preamble to the radio terminal 300, to a point on the time axis before an initiation timing t0 of a communication frame time period.

This allows the preamble to be transmitted to the radio terminal 300 before suspending remote transmission and reception, even in a case of suspending remote transmission and reception under first control during a certain communication frame time period. Hence, it is possible to avoid a step-out between the radio relay device 100 and the radio terminal 300. Accordingly, synchronization between the radio relay device 100 and the radio terminal 300 can be maintained while avoiding interference.

In this embodiment, the controllers 130D and 130R suspend remote transmission and reception by use of a MAP defined in WiMAX, and suspends donor transmission and reception by use of scanning defined in WiMAX. Thus, it is possible to perform intermittent transmission and reception within an existing framework of WiMAX.

(6) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the above embodiment, the radio relay device 100 relays data between the radio base station 200 and the radio terminal 300. However, in a case where two radio terminals 300 communicate with each other according to the TDD scheme, the radio relay device 100 may relay data exchanged between these radio terminals 300. Alternatively, in a case where multiple radio relay devices 100 relay data between the radio base station 200 and the radio terminal 300, the radio relay device 100 may relay data exchanged between other radio relay devices 100.

Note that although in the above embodiment the radio communication system 1 according to WiMAX (IEEE802.16) has been described, the invention is not limited to WiMAX and it is only necessary that the radio communication system employs the TDD scheme. Accordingly, the present invention is also applicable to a next-generation PHS or an iBurst (registered trademark) system, for example.

As described above, the present invention naturally includes various embodiments which are not described herein. Accordingly, the technical scope of the present invention should be determined only by the matters to define the invention in the scope of claims regarded as appropriate based on the description.

Note that the entire contents of Japanese Patent Application No. 2008-235926 (filed on 16 Sep., 2008) are incorporated herein by reference.

INDUSTRIAL APPLICABILITY

As has been described, the radio relay device and the radio relay method according to the present invention allow data to be relayed continuously while avoiding influence by interference in the radio relay device without changing the communication frequencies, and are also prevented from increasing in size and cost. Thus, the invention is advantageous in the field of radio communication such as mobile communication.

The invention claimed is:

1. A radio relay device configured to relay data transmitted and received by a first radio communication device and a second radio communication device in a radio communication system in which each of communication time frames segmented on a time axis is provided, by time sharing, with a downlink time period for transmitting data from the first radio communication device to the second radio communication device, and an uplink time period for transmitting data from the second radio communication device to the first radio communication device, the radio relay device comprising:

a first transceiver configured to perform first transmission and reception of receiving data from the first radio communication device in the downlink time period and transmitting data to the first radio communication device in the uplink time period, the first transmission and reception using a predetermined frame format;

a second transceiver configured to perform second transmission and reception of transmitting data to the second radio communication device in the downlink time period and receiving data from the second radio communication device in the uplink time period, the second transmission and reception using the predetermined frame format; and a controller configured to control the first transmission and reception as well as the second transmission and reception, wherein the controller performs first control of causing execution of the first transmission and reception and suspending of the second transmission and reception during the downlink time period and the uplink time period which are included in a same communication time frame, and second control of causing execution of the second transmission and reception and suspending of the first transmission and reception during the downlink time period and the uplink time period which are included in a same communication time frame.

2. The radio relay device according to claim 1, wherein the controller alternately performs the first control and the second control.

3. The radio relay device according to claim 1, wherein the second transceiver transmits, to the second radio communication device, synchronization information used to establish and maintain synchronization between the radio relay device and the second radio communication device, and the controller shifts a timing, at which the second transceiver transmits the synchronization information to the second radio communication device, to a point on a time axis before an initiation timing of the communication time frame.

4. The radio relay device according to claim 1, wherein radio communication according to orthogonal frequency division multiplexing is performed in the radio communication system.

5. The radio relay device according to claim 1, wherein the first radio communication device is a radio base station and the second radio communication device is a radio terminal.

6. A radio relay method which is used for a radio relay device to relay data transmitted and received by a first radio communication device and a second radio communication device in a radio communication system in which each of communication time frames segmented on a time axis is provided, by time sharing, with a downlink time period for transmitting data from the first radio communication device to the second radio communication device, and an uplink time period for transmitting data from the second radio communication device to the first radio communication device, the radio relay method comprising the step of:

controlling first transmission and reception of receiving data from the first radio communication device in the downlink time period and transmitting data to the first radio communication device in the uplink time period, and second transmission and reception of transmitting data to the second radio communication device in the downlink time period and receiving data from the second radio communication device in the uplink time period, the first transmission and reception using a predetermined frame format, the second transmission and reception using the predetermined frame format, wherein in the controlling step, first control is performed to cause execution of the first transmission and reception and suspending of the second transmission and reception during the downlink time period and the uplink time period which are included in a same communication time frame, and second control is performed to cause execution of the second transmission and reception and suspending of the first transmission and reception during the downlink time period and the uplink time period which are included in a same communication time frame.

* * * * *